United States Patent
Gotsmann et al.

(10) Patent No.: US 10,054,494 B2
(45) Date of Patent: Aug. 21, 2018

(54) TEMPERATURE SENSING (71) Applicant: International Business Machines Corporation, Armonk, NY (US)

(72) Inventors: Bernd Gotsmann, Horgen (CH); Fabian Menges, Urdorf (CH); Heike Riel, Baech (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 318 days.

(21) Appl. No.: 14/946,940

(22) Filed: Nov. 20, 2015

(65) Prior Publication Data
US 2016/0146746 A1 May 26, 2016

(30) Foreign Application Priority Data
Nov. 26, 2014 (GB) .................................. 1420993.6

(51) Int. Cl.
*G01K 3/04* (2006.01)
(52) U.S. Cl.
CPC ..................... *G01K 3/04* (2013.01)
(58) Field of Classification Search
CPC .......... G01K 3/04; G01Q 30/00; G01Q 30/04; G01Q 30/06; G01Q 30/10; G01Q 40/00; G01Q 40/02
See application file for complete search history.

(56) References Cited

U.S. PATENT DOCUMENTS

| 4,942,299 A * | 7/1990 | Kazmerski | G01Q 30/02 250/307 |
| 6,095,679 A * | 8/2000 | Hammiche | B82Y 35/00 374/11 |

(Continued)

FOREIGN PATENT DOCUMENTS

| EP | 834069 B1 | 3/2013 |
| WO | 2011002201 A9 | 1/2011 |
| WO | 2012165791 A2 | 12/2012 |

OTHER PUBLICATIONS

Kim, et al, "Quantitative Measurement With Scanning Thermal Microscope by Preventing the Distortion Due to the Heat Transfer Through the Air," ACS Nano, Nov. 19, 2011.

(Continued)

*Primary Examiner* — Lisa Caputo
*Assistant Examiner* — Philip Cotey
(74) *Attorney, Agent, or Firm* — Rabin Bhattacharya (57) ABSTRACT An Apparatus and method are provided for sensing temperature of a sample. Apparatus 2 has a sensor 5, positionable relative to a sample 3, which is responsive to temperature of a region of the sample at each position of the sensor. Sensor circuitry 10 provides a response signal indicative of the sensor response at the position of the sensor. Sample-temperature controller 12 controls temperature of sample 3 independently of sensor 5. Sample-temperature controller 12 effects a time-dependent modulation of the sample temperature such that a time-dependent heat flux is generated between the sample and the sensor at the position of the sensor. Temperature analyzer 11 extracts time-averaged and time-dependent components of the response signal due to the modulation of the sample temperature, and processes the components to produce an output indicative of temperature of the sample at the position of the sensor.

21 Claims, 4 Drawing Sheets (56) References Cited

U.S. PATENT DOCUMENTS

| | | | |
|---|---|---|---|
| 6,530,686 B1* | 3/2003 | Nakamura | G01N 25/4826 |
| | | | 219/494 |
| 7,448,798 B1 | 11/2008 | Wamg | |
| 7,682,071 B2* | 3/2010 | Kim | G01F 1/6884 |
| | | | 374/147 |
| 8,458,810 B2 | 6/2013 | McConney | |
| 2004/0129063 A1* | 7/2004 | Balooch | B82Y 35/00 |
| | | | 73/105 |
| 2007/0206654 A1* | 9/2007 | Merzliakov | G01K 17/006 |
| | | | 374/31 |
| 2010/0042356 A1* | 2/2010 | Kjoller | B82Y 35/00 |
| | | | 702/136 |
| 2010/0195695 A1* | 8/2010 | Van De Kerkhof | G01K 17/00 |
| | | | 374/31 |
| 2011/0154546 A1* | 6/2011 | Proksch | B82Y 35/00 |
| | | | 850/1 |
| 2012/0260374 A1* | 10/2012 | McConney | B82Y 35/00 |
| | | | 850/1 |
| 2014/0064322 A1* | 3/2014 | Maksymovych | G01K 7/01 |
| | | | 374/15 |

OTHER PUBLICATIONS

Bodzenta, et al, "Quantitative Scanning Thermal Microscopy Based on Determination of Thermal Probe Dynamic Resistance," Rev. Sci. Instrum, Sep. 2013.

Bontempi, et al, "DC and AC Scanning Thermal Microscopy Using Microthermoelectric Probe," Old City Publishing, 2014.

\* cited by examiner

TEMPERATURE SENSING

CROSS-REFERENCE TO RELATED APPLICATION

This application claims the benefit of priority United Kingdom Patent Application No. 1420993.6, filed Nov. 26, 2014, the contents of which are incorporated herein by reference.

BACKGROUND

This invention is related to the sensing of sample temperatures at a microscopic level.

The measurement of temperature is fundamental to diverse fields of science and technology. Temperature affects the properties of matter and physical phenomena, governs the kinetics of chemical reactions, triggers biomolecular mechanisms and controls engineering processes. Some of today's most prominent technical challenges such as self-heating in electronics, sustainable energy conversion and information processing rely on in-depth understanding of the transfer of thermal energy and a quantification of temperature distributions in active devices.

Attempts to quantify thermal properties and processes at a microscopic level have used a scanning probe microscope in which a temperature sensor is provided at the tip of the probe. This technology is referred to as scanning thermal microscopy (SThM). In SThM systems, the probe tip is brought into contact or close proximity with a sample surface to establish a thermal coupling due to heat flux between the sample and the temperature sensor. To perform a scan, the probe is moved through multiple positions relative to the sample, e.g. by moving a platform supporting the sample. Circuitry associated with the sensor provides a signal indicating the response of the sensor to local temperature at each position.

SThM has been applied to probe thermal properties such as thermal conductivity and thermal processes such as phase transitions or Joule-heating. Different kinds of scanning probes, both actively-heated and passive, have been employed using various sensing elements such as fluorescence, thermocouple or thermoresistive sensors. Examples of such SThM systems are described in U.S. Pat. No. 5,441,343, and "Scanning probe methods for thermal and thermoelectric property measurements." Further examples, in which samples are scanned in both contact and non-contact modes, are described in International Patent Application Publication No's. WO 2011/002201 A2 and WO 2012/165791 A2; and "Quantitative Measurement with Scanning Thermal Microscope by Preventing the Distortion Due to the Heat Transfer through the Air." Some systems use both AC (alternating current) and DC (direct current) excitation of a thermoresistive sensor on the probe in order to heat the sensor.

All such temperature sensing systems face one common challenge in the quantification of thermal properties. The acquired measurement signal depends on the heat flux Q between the sensor and the sample and this is generally a function of two unknown quantities, the thermal conductance G and the temperature difference $\Delta T$ and between the sensor and sample. The problem is exacerbated when using very small probes designed to sense sample temperatures at high spatial resolution, as in SThM systems. This is because, on scaling down the size, the thermal conductance G scales down and becomes increasingly difficult to quantify.

In most prior attempts to quantify temperature fields using scanning probes, the thermal conductance is assumed to be constant, or approximated from literature or calibrated for a given probe. Consequently, the acquired temperature signal is disturbed by local variations of the thermal coupling between the sensor and the sample. This disturbance becomes apparent when the thermal coupling is changing, e.g. due to topography related changes in the size of the coupling area or material related changes in thermal conductance.

An attempt to quantify temperature using a scanning probe by nullifying the heat flux between the sensor and sample is described in "Ultra-high vacuum scanning thermal microscopy for nanometer resolution quantitative thermometry." The heat flux between the sensor and sample is measured at a plurality of different temperatures of an actively heated sensor, and the sample temperature is extracted from interpolation of the sensor temperature to zero heat flux. This technique is inherently slow and complicated, and is unsuitable for use in a scanning mode of a microscope within acceptable signal acquisition times.

Another attempt to quantify temperature fields is described in "Quantitative thermometry of nanoscale hot spots." The heat flux between the sensor and sample is first acquired for a known temperature difference $\Delta T$, followed by a consecutive measurement of the heat flux at an unknown temperature difference. Changes in the heat flux are related to changes in the sample temperature. By first performing a reference measurement, this method requires two consecutive measurements and high reproducibility of the thermal coupling between the two measurements. This both inhibits practicality of the method and has adverse implications for reliability.

SUMMARY

One aspect of the present invention provides an apparatus for sensing temperature of a sample. The apparatus includes: a sensor, positionable relative to a sample, which is responsive to temperature of a region of the sample at each position of the sensor; sensor circuitry for providing a response signal indicative of the sensor response at the position of the sensor; a sample-temperature controller for controlling temperature of the sample independently of the sensor, the sample-temperature controller effecting a time-dependent modulation of the sample temperature such that a time-dependent heat flux is generated between the sample and the sensor at the position of the sensor; and a temperature analyzer for extracting time-averaged and time-dependent components of the response signal due to the modulation of the sample temperature, and for processing the components to produce an output indicative of temperature of the sample at a the position of the sensor.

One aspect of the present invention provides a method for sensing temperature of a sample. The method includes: positioning a sensor relative to a sample, the sensor being responsive to temperature of a region of the sample at each position of the sensor; obtaining, via sensor circuitry associated with the sensor, a response signal indicative of the sensor response at the position of the sensor; controlling temperature of the sample independently of the sensor to effect a time-dependent modulation of the sample temperature such that a time-dependent heat flux is generated between the sample and the sensor at the position of the sensor; extracting time-averaged and time-dependent components of the response signal due to the modulation of the sample temperature; and processing the components to produce an output indicative of temperature of the sample at the position.

BRIEF DESCRIPTION OF THE SEVERAL VIEWS OF THE DRAWINGS

Preferred embodiments of the invention will now be described, by way of example, with reference to the accompanying drawings in which.

DETAILED DESCRIPTION

Figure 1:
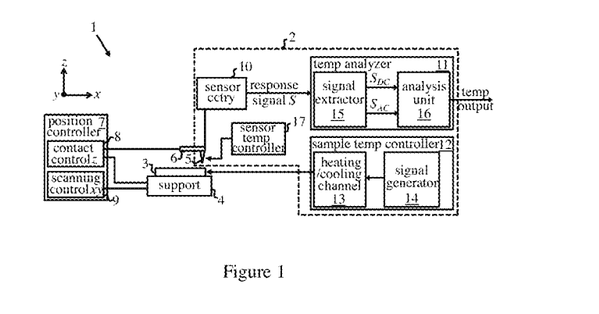
FIG. 1 is a schematic representation of a scanning thermal microscope embodying the invention.

FIG. 1 is a generalized schematic of a scanning thermal microscope 1 embodying the invention. Microscope 1 includes temperature sensing apparatus, indicated generally at 2, for sensing temperature of sample 3 held by sample support 4. Temperature sensing apparatus 2 includes a temperature sensor, indicated schematically at 5, provided at the tip of cantilever probe 6 of the microscope. Any suitable sensor can be employed here, for example a thermoresistive, thermocouple or thermoreflective sensor. Position controller 7 controls positioning of probe 6 relative to sample 3. Position controller 7 is shown as including contact controller 8 and scanning controller 9. Contact controller 8 controls positioning of sensor tip 5 in the z-direction indicated in the figure, so as to control contact between the sensor and sample in operation. Contact controller 5 can be implemented in known manner to control the tip-sample contact force by sensing deflection of the cantilever probe and adjusting the z-positioning to maintain a constant contact force. Scanning controller 9 effects movement of sample support 4 in the xy plane to implement a scanning operation. Through operation of position controller 7, sensor 5 can be brought into thermal coupling with the sample at a measurement position such that a heat flux, which is due (at least primarily) to thermal conduction, is generated in response to a temperature difference between the sample and sensor. Sensor 5 can be moved through multiple positions relative to sample 3 to scan the sample surface, e.g. via a raster movement. Due to provision of the sensor as the tip of the microscope probe, dimensions are such that sensor 5 is responsive to temperature of a region of the sample in the immediate vicinity of the probe tip at each measurement position during the scan.

Temperature sensing apparatus 2 includes sensor circuitry 10, temperature analyzer 11 and sample-temperature controller 12. Sensor circuitry 10 is connected to sensor 5 and provides a response signal S indicative of the sensor response at a measurement position. The nature of sensor circuitry 10 will depend on operation of sensor 5 and suitable implementations for different sensors will be readily apparent to those skilled in the art. Sample-temperature controller 12 controls temperature of sample 3 independently of sensor 5. In operation, sample-temperature controller 12 effects a time-dependent modulation of the sample temperature such that a time-dependent heat flux is generated between sample 3 and sensor 5 at a measurement position. The sample temperature controller includes signal generator 13 for generating the modulation signal. The modulation signal controls operation of heating/cooling channel 14 for varying the temperature of sample 3. Heating/cooling channel 14 can be implemented in various ways depending on the nature of sample 3. The heating/cooling mechanism can, for instance, exploit electronic activity, e.g. for resistive heating of the sample, or interaction of the sample with radiation, e.g. via laser irradiation, or any other convenient temperature control mechanism. While in principle channel 14 can be operative for heating and/or cooling of the sample, preferred embodiments of the present invention exploit a heating mechanism for convenience of operation.

Temperature analyzer 11 includes signal extractor 15 and analysis unit 16. Signal extractor 15 receives response signal S from sensor circuitry 10 and extracts time-averaged and time-dependent components of the response signal due to the modulation of sample temperature by sample temperature controller 12. The time-averaged (hereinafter "DC" for convenience) and time-dependent (hereinafter "AC" for convenience) components are indicated in the figure by SDC and SAC respectively. Signal components SDC, SAC are supplied to analysis unit 16 which processes the components to produce an output indicative of temperature of the sample at a measurement position. Circuity for implementing signal extractor 15, and the processing operation in analysis unit 16, can vary depending on operating parameters of apparatus 2 and the particular form of the sample temperature modulation. Examples are described in detail below. In general, the processing functionality of analysis unit 16 can be implemented in hardware or software or a combination thereof, and suitable implementations will be apparent to those skilled in the art from the description herein.

In the preferred aspects of the present invention shown, temperature sensing apparatus 2 also includes sensor-temperature controller 17 for controlling temperature of sensor 5 independently of sample 3. Sensor-temperature controller 17 preferably includes mechanism for heating the sensor. Various heating mechanisms, e.g. exploiting electronic activity such as resistive heating, or laser irradiation, etc., can be employed here depending on the particular nature of sensor 5.

Operation of temperature sensing apparatus 2 will be described in detail below with reference to a preferred embodiment of the present invention. In this embodiment, illustrated in FIG. 2, sensor 5 includes a thermoresistive sensor. Sensor 5 is brought into mechanical contact with sample 3 for a scanning operation, whereby the small area of mechanical contact between the tip and a given spot of the sample surface then defines the area of the sample in which temperature is measured. The resistance of thermoresistive sensor 5 varies in a predetermined manner with temperature. Sensor temperature can therefore be measured by application of a suitable current and measurement of the voltage drop across the sensor, or vice versa. The same mechanism can also be exploited to heat the sensor because current flow causes resistive heating in thermoresistive sensor 5. Sensor circuitry 10 in this embodiment thus includes sensor temperature controller 7 in the form of sensor power supply 20 for controlling the power supplied to sensor 5 and hence the sensor operating temperature. Voltage measurement circuit 21 measures the resulting voltage drop across sensor 5 and outputs the result as the sensor response signal S.

Figure 2:
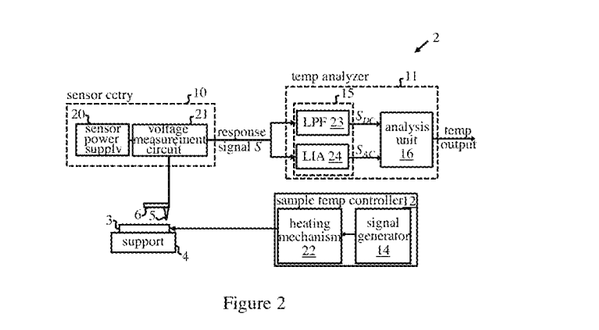
FIG. 2 is a more detailed block diagram of a first embodiment of temperature sensing apparatus in FIG. 1.

Sample temperature controller 11 of this embodiment of the present invention includes heating mechanism 22 for heating sample 3 in accordance with the time-dependent modulation signal from signal generator 14. Sample 3 here is assumed to be a resistive sample, whereby heating mechanism 22 simply includes circuitry for supplying a current to the sample to effect resistive heating. The modulation signal generated by signal generator 14 is such that the resulting time-dependent modulation of the sample temperature includes a first periodic component having a first frequency ω. The frequency ω is selected such that the period 1/w is less than (typically e.g. 1/10 of) the measurement period at each measurement position during the scan.

Signal extractor 15 of temperature analyzer 11 here includes a low-pass filter (LPF) 23 and a lock-in amplifier (LIA) 24. Filter 23 extracts the DC component SDC of the sensor response signal S. Lock-in amplifier 24, which also receives the modulation signal from signal generator 15, extracts from the sensor response signal the AC component having the aforementioned frequency ω. Analysis unit 16 then produces the temperature output in dependence on the magnitude D of the DC component and the amplitude A1 of the AC component of frequency ω. In particular, the temperature output is dependent on a first ratio r1 of the amplitude A1 to a sum of the magnitude D and amplitude A1, i.e. r1=A1/(D+A1).

In this preferred embodiment of the present invention, the modulation signal produced by signal generator 15 causes the sample temperature to vary sinusoidally at the frequency ω. In particular, the resulting sample temperature TS varies from an ambient temperature TA according to:

$$TS=TA+T0+T1\sin(\omega t)$$

where T0 is a constant. Conveniently, the frequency ω can be selected to be sufficiently small that Joule heating of the sample at a frequency ω/2 results in sample temperature control with T0=T1. (An appropriate value for ω here will vary with material and geometry of the sample, and dimensions of the regions of heat generation within the sample, as will be apparent to those skilled in the art. However, ω might typically be about 1 kHz for samples of nanometric dimensions). In addition to active heating of the sample, sensor 5 is actively heated, by operation of sensor power supply 20, from an ambient temperature TA to an operating temperature Top for the measurement operation. In this first example, the sensor is heated with substantially constant heating power and the sensor temperature is measured while the sample temperature is modulated as described above. The following analysis explains operation of sensing apparatus 2 in this case.

When the tip is not in contact with the sample, a constant heating power Pin from power supply 20 results in a temperature rise of sensor 5 from ambient temperature TA to the operating temperature Top according to a sensor thermal resistance RS:

$$RS=(Top-TA)/Pin \quad (1)$$

As described above, with T0=T1 the sample temperature TS varies according to:

$$TS=TA+T1(1+\sin(\omega t)) \quad (2)$$

When the tip is in contact with the sample, the measured sensor temperature TN is:

$$TN=Top+TSDC+TSAC(\sin(\omega t)) \quad (3)$$

where TSDC is the sensor response to the tip/sample heat flux due to the DC component of the sample temperature modulation, and TSAC is the sensor response to the heat flux due to the AC component of the sample temperature modulation. TSDC thus corresponds to the magnitude D of the DC response component SDC above, and TSAC corresponds to the amplitude A1 of the AC response component SAC.

The heat QTS flowing through the tip-sample contact is characterized by thermal resistance RTS given by:

$$RTS=(TN-TS)/QTS. \quad (4)$$

Energy conservation requires that:

$$Pin=QTS+(TN-TA)/RS. \quad (5)$$

After inserting Equations (1) to (4) into Equation (5) to eliminate QTS, TN and TS, the resulting equation, which must be valid at all times, can be divided into time-dependent and time-independent parts from which RTS and RS can be eliminated to arrive at:

$$T1=(Top-TA)\times TSAC/(TSDC+TSAC) \quad (6)$$

This is equivalent to T1=(Top-TA)×r1 where r1 is the first ratio A1/(D+A1) described above.

Analysis unit 10 of apparatus 2 can thus calculate T1 at each measurement position as the tip scans the sample surface. The output of the analysis unit can include the resulting T1 values. These indicate the difference between the sample temperature and ambient temperature via Equation (2) above, and thus provide a temperature distribution for the sample surface. Alternatively, for example, absolute sample temperatures can be calculated via Equation (2) and output by analysis unit 16 to give an absolute temperature map for the sample.

For particularly convenient operation, the sensor is heated to a sufficiently high temperature Top to ensure that TSDC>>TSAC, i.e. D>>A1, whereby the first ratio simplifies to r1=A1/D=TSAC/TSDC and the temperature output can be approximated by:

$$T1=(Top-TA)\times TSAC/TSDC=(Top-TA)\times A1/D. \quad (7)$$

Figure 3A:
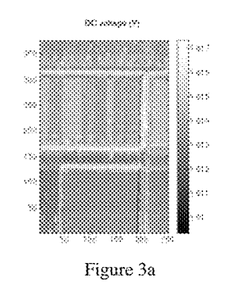
FIGS. 3a to 3c show sample images based on components of a sensor response signal obtained with the FIG. 2 apparatus.
Figure 3B:
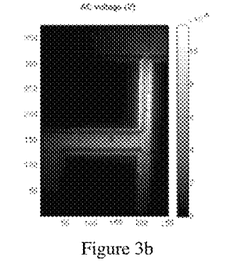
Figure 3C:
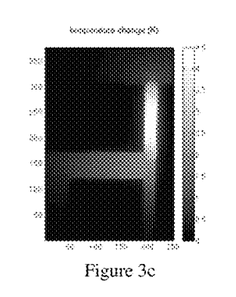

FIGS. 3a to 3c show gray-scale sample images based on the signal components and temperature output obtained with the above system. The FIG. 3a image is based on the magnitude TSDC=D of the DC component SDC. The FIG. 3b image is based on the amplitude TSAC=A1 of the AC component SAC. The FIG. 3c image is based on the overall sample temperature change from ambient, i.e. the final temperature output T1.

Figure 4:
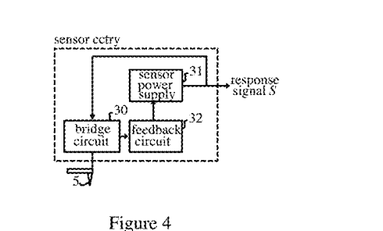
FIG. 4 illustrates alternative sensor circuitry used in a second embodiment of the temperature sensing apparatus.
Figure 5A:
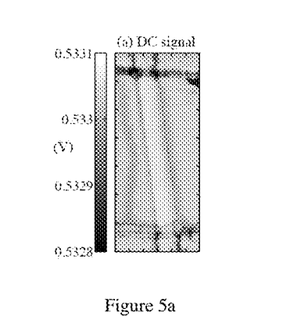
FIGS. 5a to 5e show sample images based on components of the sensor response signal using a different sample-temperature modulation in the FIG. 2 apparatus.
Figure 5B:
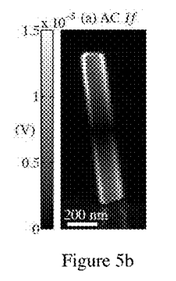
Figure 5C:
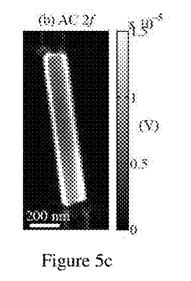
Figure 5D:
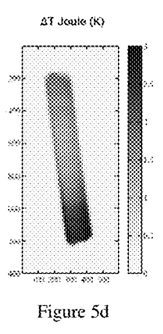
Figure 5E:
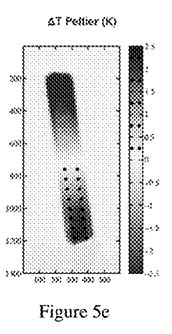

In a modification to the above system, sensor is maintained at a substantially constant temperature by adjusting the heating power, and the sensor circuit measures the resulting power variation. FIG. 4 indicates a modified implementation for sensor circuitry 10 in this case. Thermoresistive sensor 5 is connected in one arm of a bridge circuit 30 to which a supply voltage is applied by sensor power supply 31. Bridge circuit 30 can be a Wheatstone bridge for example. An output of the bridge circuit, dependent on voltage dropped across sensor 5, is supplied to a feedback circuit 32. The feedback circuit 32 controls power supply 31 to adjust the supplied power so as to maintain the bridge output, and hence sensor temperature, at a constant level. The following analysis explains operation of sensing apparatus 2 in this case.

When the tip is not in contact with the sample, a constant heating power Pop is need to heat sensor 5 to a temperature TN above ambient temperature TA. According to Equation (2) above, the sample temperature TS varies as:

$$TS=TA+T1(1+\sin(\omega t)) \quad (2)$$

When the tip is in contact with the sample, the measured heating power Pin is:

$$=Pop+PSDC+PSAC(\sin(\omega t)) \quad (8)$$

where PSDC is the sensor response to the DC component of the sample temperature modulation and PSAC is the sensor response to the AC component of the sample temperature modulation. PSDC thus corresponds to the magnitude D of the DC response component SDC above, and PSAC corresponds to the amplitude A1 of the AC response component SAC.

The heat QTS flowing through the tip-sample contact is characterized by thermal resistance RTS given by Equation (4) above:

$$RTS=(TN-TS)/QTS. \quad (4)$$

Energy conservation requires that:

$$-Pop=QTS \quad (9)$$

After inserting Equations (2), (8) and (4) into Equation (9), separating time-dependent and time-independent parts and eliminating RTS one arrives at:

$$T1=(TN-TA)\times PSAC/(PSDC+PSAC) \quad (10)$$

Since the sensor temperature is held constant in this embodiment of the present invention at an operating TN=Top, this becomes:

$$T1=(Top-TA)\times PSAC/(PSDC+PSAC) \quad (11)$$

This is equivalent to T1=(Top−TA)×r1 where r1 is the first ratio A1/(D+A1). As before, Top is preferably sufficiently high that PSDC>>PSAC, i.e. D>>A1, whereby the first ratio simplifies to r1=A1/D=PSAC/PSDC and the temperature output can be approximated by:

$$T1=(Top-TA)\times PSAC/PSDC=(Top-TA)\times A1/D. \quad (12)$$

Alternative aspects of the present invention can effectively utilize a combination of the above systems, keeping neither input power nor temperature constant but setting a different electronic configuration, such as constant electric current or constant applied voltage. In addition, the sensor can be driven with a modulated heating power or modulated operating temperature in order to improve sensitivity as is well known in the art. Suitable modifications to the above embodiments in these cases will be apparent to those skilled in the art.

In another embodiment of the present invention, sample-temperature controller 12 can be adapted such that the time-dependent modulation of the sample temperature additionally includes a second periodic component having a second frequency. Temperature analyzer 11 can then be adapted to extract from the response signal a second time-dependent component having this second frequency. In particular, in some cases the heating of the sample leading to the sample-temperature variation can depend on the polarity of the heating stimulus. For example, the heat produced in an electric device can depend on the heating current I=I0 sin(ωt) in a non-linear fashion resulting in:

$$TS=TA+T0+T1\sin(\omega t)+T2\sin(2\omega t)$$

where ω is the first frequency and the second frequency is 2ω. The T1 term can be due to Peltier heating/cooling and the T2 term can be due to Joule heating of a common semiconductor for example. In this case, sensing apparatus 2 can account for this by extracting lock-in signals at both frequencies ω and 2ω. Hence, signal extractor 15 extracts two AC components SAC1 and SAC2 corresponding to components of the sensor response signal at frequencies ω and 2ω respectively. For constant input power, the sensor temperature TN is given by:

$$TN=Top+TSDC+TSAC1(\sin(\omega t))+TSAC2(\sin(2\omega))+\ldots$$

where TSAC1 is the sensor response to the AC component of the sample temperature modulation at frequency ω, and TSAC2 is the sensor response to the AC component of the sample temperature modulation at frequency 2ω. Following the earlier analysis the resulting equations are similar:

$$T1=(Top-TA)\times TSAC1/(TSDC+TSAC1) \text{ and}$$

$$T2=(Top-TA)\times TSAC2/(TSDC+TSAC2).$$

Value T2 here thus depends on a second ratio r2 of an amplitude A2=TSAC2 of the second time-dependent component of frequency 2ω to the sum of A2 and the DC magnitude D=TSDC.

As before, equivalent equations are obtained for the constant sensor temperature mode of operation. The equations can also be simplified as explained earlier for sufficiently high sensor operating temperatures. The output of analysis unit 16 here can include the two values T1 and T2 separately, or these values can be combined as desired to produce a single output value indicative of temperature. The system can also be extended to extract additional AC components due to higher order terms of the sample temperature modulation if desired.

FIGS. 5a to 5e show gray-scale sample images based on the signal components and temperature output obtained with the foregoing system. The figures show a semiconductor nanowire attached to two metal electrodes on a silicon oxide substrate. The diameter of the nanowire is 120 nm. The FIG. 5a image is based on the magnitude TSDC=D of the DC component SDC. The FIG. 5b image is based on the amplitude TSAC1=A1 of the AC component SAC1. The FIG. 5c image is based on the amplitude TSAC2=A2 of the AC component SAC2. The FIG. 5d image is based on the sample temperature change due to Joule heating, i.e. temperature output T2. The FIG. 5e image is based on the sample temperature change due to Peltier heating, i.e. temperature output T1.

It can be seen that, by simultaneous measurement of time-averaged and time-dependent components of the sensor response due to modulation of the sample temperature, the above systems enable quantification of sample temperatures, independent of disturbances due to thermal conductance variations, in a simple one-step measurement process. Sample temperatures can be accurately and efficiently mapped even at nanoscopic length-scales via a single scan of the sample surface.

While preferred embodiments of the present invention have been described by way of example above, many alternatives and modifications can be envisaged. Other time-dependent signals can be used to obtain a different sample-temperature modulation function. For example, the sample heating/cooling mechanism can be switched on and off repeatedly or otherwise controlled to effect any transient cool-down and/or heat-up behavior. Various other circuit components can also be employed for component extraction in signal extractor 15 as will be apparent to those skilled in the art.

Scanning can be performed with the sensor in close proximity to, but not mechanical contact with, the sample in some embodiments of the present invention. Sensor/sample positioning can be controlled by movement of either or both of the sensor and sample. Moreover, while described in the particular context of a scanning probe microscope, embodiments of the present invention can of course be employed in other temperature sensing systems.

Embodiments of the present invention thus modulate the heat flux between the sensor and sample by modulating the temperature of the sample independently of the sensor. By extracting and processing time-averaged and time-dependent components of the sensor response signal due to this modulation, an output indicative of sample temperature can be obtained. Apparatus embodying the invention can provide accurate temperature measurements in which the effects of the aforementioned disturbances due to variations in thermal conductance are inhibited. Moreover, this can be achieved via a simple, one-step measurement process based on extraction of the time-averaged and time-dependent response components. Unlike prior systems which require a plurality of measurements to obtain temperature information, apparatus embodying the invention can be eminently practical for scanning mode implementations and can offer fast, efficient and highly accurate SThM systems.

The temperature sensor can be positioned relative to the sample via a mechanism for moving the sample and/or the sensor. At each relative sensor/sample position, the sensor responds to the temperature of a region of the sample giving rise to a heat flux between the sample and sensor, typically the region immediately next to the sensor. If the sensor is moved through multiple measurement positions to scan the sample, the output of the temperature analyzer indicates the temperature distribution over the sample. In preferred embodiments of the present invention, the temperature analyzer output provides quantitative temperature measurements. The temperature analyzer can, for example, quantify absolute temperature at points on the sample surface, or temperature variation relative to some reference value, or values corresponding to at least one component of the temperature modulation at each measurement position.

In general, the time-averaged component of the response signal can be affected by a constant component of the sample-temperature modulation and/or control of the sensor temperature (where provided). In preferred embodiments of the present invention, the sample-temperature modulation includes a periodic component. In particular, the sample-temperature controller is preferably adapted such that the time-dependent modulation of the sample temperature includes a first periodic component having a first frequency. (In general, this first periodic component can be one of a number of constituent components which together make up the overall sample-temperature modulation). The temperature analyzer can be adapted to extract from the response signal a first time-dependent component having the first frequency. The output of the temperature analyzer can be dependent on a magnitude D of the time-averaged component and an amplitude A1 of the first time-dependent component. In preferred embodiments of the present invention, the output is dependent on a first ratio r1 of the amplitude A1 to at least the magnitude D. For example, the first ratio r1 can be a ratio of the amplitude A1 to a sum of the magnitude D and the amplitude A1, that is: $r1=A1/(D+A1)$.

The first periodic component of the sample modulation is sinusoidal in preferred embodiments of the present invention, whereby the sample temperature varies sinusoidally at the first frequency. For example, the sample-temperature controller can be adapted to vary the sample temperature TS from an ambient temperature TA according to $TS=TA+T0+T1\sin(\omega t)$, where $\omega$ is the first frequency and T0 is a constant temperature component. Here, T1 is the amplitude of the sinusoidal temperature component. There can also be additional, higher order terms to the temperature modulation as illustrated below. Conveniently, the sample-temperature controller is adapted such that $T0=T1$.

Advantageously, apparatus embodying the invention includes a sensor-temperature controller for controlling temperature of the sensor independently of the sample. If the sensor-temperature controller serves to adjust the sensor temperature from an ambient temperature TA to an operating temperature Top, then the temperature analyzer is preferably adapted such that the output is dependent on the first ratio r1 and (Top−TA), e.g. via the product $r1\times(Top-TA)$. If the first ratio $r1=A1/(D+A1)$ as described above, then the temperature analyzer output is dependent on $(Top-TA)\times A1/(D+A1)$. This value corresponds to the amplitude T1 of the sinusoidal component of the sample temperature modulation. By appropriate temperature control, and conveniently by appropriate control of the sensor temperature, the apparatus can be adapted to operate such that $D \gg A1$. In this case, the first ratio can be approximated as $r1=A1/D$ and the temperature analyzer output can be dependent on $(Top-TA)\times A1/D$.

In preferred embodiments of the present invention, the sensor includes a thermoresistive sensor. The probe current can then be used to heat the sensor, providing a convenient sensor-temperature control mechanism.

In some embodiments of the present invention, the sample-temperature controller can be adapted such that the time-dependent modulation of the sample temperature also includes a second periodic component having a second frequency. As described in detail below, in this case the temperature analyzer can be adapted additionally to extract from the response signal a second time-dependent component having the second frequency.

Preferred apparatus is adapted to operate in a scanning mode wherein the sensor is movable, relative to the sample, through multiple positions, and wherein the temperature analyzer is adapted to produce the output indicative of temperature at each of the positions. In particular, the apparatus can be provided as part of an SThM system in which the sensor includes a tip of a microscope probe.

An embodiment of the present invention thus provides a scanning thermal microscope including: a probe; a position controller for positioning the probe relative to a sample; and apparatus according to the first aspect of the invention for sensing temperature of the sample, wherein the sensor is provided at the probe tip.

It will be appreciated that many other changes and modifications can be made to the exemplary embodiments of the present invention described without departing from the scope of the invention.

What is claimed is:

1. An apparatus for sensing temperature of a sample, the apparatus comprising:
   a sensor that can be moved into one or more positions, relative to a sample, which is responsive to temperature of a region of the sample at each position of the sensor;
   sensor circuitry for providing a response signal indicative of the sensor response at the position of the sensor;
   a sample-temperature controller for controlling temperature of the sample independently of the sensor, the sample-temperature controller effecting a time-dependent modulation of the sample-temperature such that a time-dependent heat flux is generated between the sample and the sensor at the position of the sensor; and
   a temperature analyzer for extracting time-averaged and time-dependent components of the response signal due to the modulation of the sample-temperature, and for processing the components to produce an output indicative of temperature of the sample at the position of the sensor
wherein the sample-temperature controller comprises a signal generator for generating the modulation signal that controls operation of a heating/cooling channel for varying the temperature of the region of the sample.

2. The apparatus according to claim 1 wherein:
the sample-temperature controller is adapted such that the time-dependent modulation of the sample-temperature comprises a first periodic component having a first frequency; and
the temperature analyzer is adapted to extract from the response signal a first time-dependent component having the first frequency.

3. The apparatus according to claim 2 wherein the temperature analyzer is adapted such that the output is dependent on a magnitude D of the time-averaged component and an amplitude A1 of the first time-dependent component.

4. The apparatus according to claim 3 wherein the temperature analyzer is adapted such that the output is dependent on a first ratio r1 of the amplitude A1 to at least the magnitude D.

5. The apparatus according to claim 4 wherein the first ratio r1=A1/(D+A1).

6. The apparatus according to claim 4 wherein:
the sensor-temperature controller is operable to adjust the sensor temperature from an ambient temperature TA to an operating temperature Top; and
the temperature analyzer is adapted such that the output is dependent on the first ratio r1 and (Top-TA).

7. The apparatus according to claim 4 wherein:
the sample-temperature controller is adapted to vary the sample-temperature TS from an ambient temperature TA according to $TS=TA+T0+T1\sin(\omega t)+T2\sin(2\omega t)$, where $\omega$ is the first frequency, the second frequency is $2\omega$, and T0 is a constant; and
the temperature analyzer is adapted such that the output is further dependent on a second ratio r2 of an amplitude A2 to at least the magnitude D, where A2 is an amplitude of the second time-dependent component.

8. The apparatus according to claim 6 wherein the output is dependent on r1×(Top-TA).

9. The apparatus according to claim 8 wherein the first ratio r1=A1/(D+A1) whereby the output is dependent on (Top-TA)×A1/(D+A1).

10. The apparatus according to claim 8 wherein the apparatus is adapted to operate such that D>>A1, and wherein the first ratio r1=A1/D whereby the output is dependent on (Top-TA)×A1/D.

11. The apparatus according to claim 2 wherein the sample-temperature controller is adapted to vary the sample temperature TS from an ambient temperature TA according to $TS=TA+T0+T1\sin(\omega t)$, where $\omega$ is the first frequency and T0 is a constant.

12. The apparatus according to claim 11 wherein the sample-temperature controller is adapted such that T0=T1.

13. The apparatus according to claim 2 wherein the temperature analyzer includes a low-pass filter for extracting the time-averaged component and a lock-in amplifier for extracting the first time-dependent component.

14. The apparatus according to claim 2 wherein:
the sample-temperature controller is adapted such that the time-dependent modulation of the sample temperature includes a second periodic component having a second frequency; and
the temperature analyzer is adapted to extract from the response signal a second time-dependent component having the second frequency.

15. The apparatus according to claim 1 comprising a sensor-temperature controller for controlling temperature of the sensor independently of the sample.

16. The apparatus according to claim 1 wherein, the apparatus being adapted to operate with the sensor in mechanical contact with the sample at the position.

17. The apparatus according to claim 1 wherein, the apparatus being adapted to operate in a scanning mode wherein the sensor is movable, relative to the sample, through multiple positions, and wherein the temperature analyzer is adapted to produce the output indicative of temperature at each of the positions.

18. The apparatus according to claim 1 wherein the sensor comprises a thermoresistive sensor.

19. The apparatus according to claim 1 wherein the sensor comprises a tip of a microscope probe.

20. The apparatus according to claim 1 further comprising:
a probe;
a position controller for positioning the probe relative to a sample; and
the sensor is provided at the probe tip.

21. A method for sensing temperature of a sample, the method comprising:
positioning a sensor at one or more positions relative to a sample, the sensor being responsive to temperature of a region of the sample at each position of the sensor;
obtaining, via sensor circuitry associated with the sensor, a response signal indicative of the sensor response at the position of the sensor;
controlling temperature of the sample independently of the sensor to effect a time-dependent modulation of the sample-temperature such that a time-dependent heat flux is generated between the sample and the sensor at the position of the sensor;
extracting time-averaged and time-dependent components of the response signal due to the modulation of the sample temperature; and
processing the components to produce an output indicative of temperature of the sample at the position of the sensor
wherein the sample-temperature controller comprises a signal generator for generating the modulation signal that controls operation of a heating/cooling channel for varying the temperature of the region of the sample.

* * * * *